United States Patent
Ishikawa et al.

(10) Patent No.: US 7,286,535 B2
(45) Date of Patent: Oct. 23, 2007

(54) DEVICE FOR FLOW CLASSIFYING AND PACKET FORWARDING DEVICE WITH FLOW CLASSIFY FUNCTION

(75) Inventors: Yuichi Ishikawa, Machida (JP); Takeki Yazaki, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 926 days.

(21) Appl. No.: 10/215,846

(22) Filed: Aug. 12, 2002

(65) Prior Publication Data

US 2003/0189932 A1   Oct. 9, 2003

(30) Foreign Application Priority Data

Apr. 8, 2002   (JP)   ............................ P2002-105362

(51) Int. Cl.
*H04L 12/28* (2006.01)
*H04L 12/54* (2006.01)

(52) U.S. Cl. ................. 370/392; 370/351; 370/395.31; 370/389; 370/429

(58) Field of Classification Search ................ 370/400, 370/389, 392, 390, 428, 429, 395.31, 351, 370/412, 410, 419
See application file for complete search history.

(56) References Cited

U.S. PATENT DOCUMENTS

| | | | |
|---|---|---|---|
| 6,718,326 B2 * | 4/2004 | Uga et al. ........................ 707/6 |
| 6,876,653 B2 * | 4/2005 | Ambe et al. ................. 370/389 |
| 7,028,098 B2 * | 4/2006 | Mate et al. ................... 709/238 |
| 7,061,874 B2 * | 6/2006 | Merugu et al. ............. 370/255 |
| 7,095,742 B2 * | 8/2006 | Kaganoi et al. ............. 370/392 |
| 7,130,903 B2 * | 10/2006 | Masuda et al. ............. 709/225 |
| 7,158,519 B2 * | 1/2007 | Kanakubo .................... 370/392 |

FOREIGN PATENT DOCUMENTS

| | | |
|---|---|---|
| JP | 10-285-179 | 4/1997 |
| JP | 2001-156840 | 11/1999 |
| JP | 2001-290718 | 4/2000 |

OTHER PUBLICATIONS

Masanori Uga and Kohei Shiomoto, "A Flow Identification Method Using Content Addressable Memory", Proceeding of Plenary Session of the Society of Electronics, Information and Communication Engineers, 2000, SB-4-2, p. 654.
Masanori Uga and Kohei Shiomoto, "A Flow Identification Method for Ipv6 Using Content Addressable Memory", Proceeding of Plenary Session of the Society of Electronics, Information and Communication Engineers, 2000, SB-6-21, p. 21.

* cited by examiner

*Primary Examiner*—Hanh Nguyen
(74) *Attorney, Agent, or Firm*—Reed Smith LLP; Stanley P. Fisher, Esq.; Juan Carlos A. Marquez, Esq.

(57) ABSTRACT

A flow classifier having a flow CAM having plural flow entries, a search key generator for generating a search key of a format which differs by a flow condition, and a table holding a flow search result corresponding to an address of respective flow entry of CAM, in which access is made to CAM by the search key of a variable format including at least one header information item extracted from a packet header and the flow search result is obtained from the table in accordance with the address of the flow entry coinciding with the search key outputted from CAM to thereby constitute high speed formation of flow classifying by a variety of flow conditions.

11 Claims, 13 Drawing Sheets

FIG.2 *Prior Art*
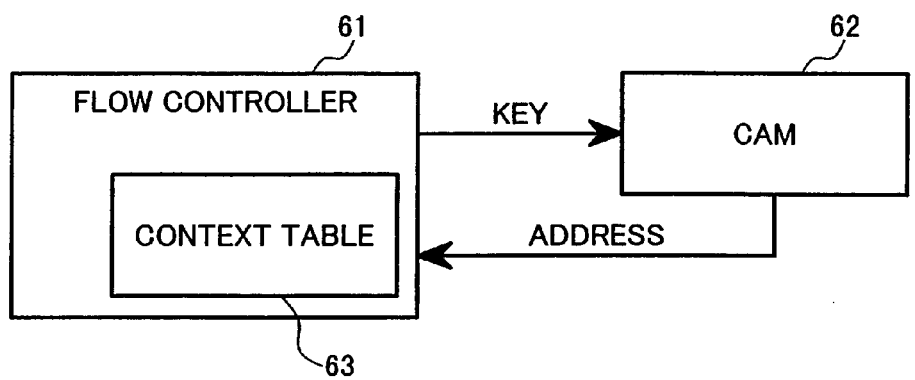
FIG.3 *Prior Art*
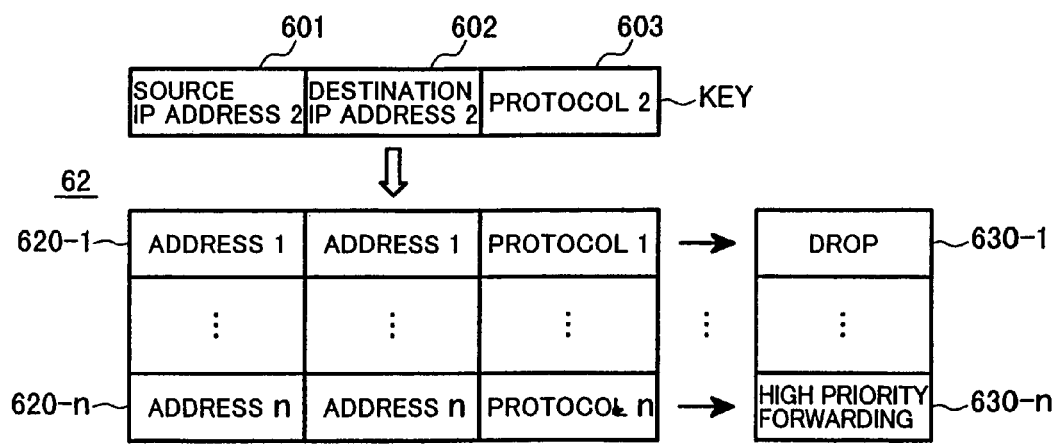

FLOW CLASSIFIER 30

FIG.9

FLOW MODE TABLE 311

| INPUT PORT NUMBER (3111) | PROTOCOL IDENTIFIER (3112) | FLOW MODE (3113) | |
|---|---|---|---|
| PORT NUMBER 1 | MPLS | MODE 1 | 311-1 |
| PORT NUMBER 2 | $IP_V6$ | MODE 2 | 311-2 |
| ⋮ | ⋮ | ⋮ | ⋮ |

FIG.10

SEARCH KEY TABLE 312

| FLOW MODE (3121) | FLOW CONDITION (ELEMENT OF SEARCH KEY) (3122) | | | |
|---|---|---|---|---|
| MODE 1 | MPLS LABEL | EXP | — | 312-1 |
| MODE 2 | SIP | SPORT | — | 312-2 |
| MODE 3 | DIP | DPORT | — | 312-3 |
| ⋮ | ⋮ | ⋮ | | ⋮ |

CONTEXT TABLE 42

FIG.12

FLOW CAM 33

| | 331 | 332 | 333 | 334 | |
|---|---|---|---|---|---|
| 330-1 | MODE 1 | PORT NUMBER 1 | MPLS (LABEL1) | EXP(1) | EN-11 |
| | MODE 1 | PORT NUMBER 1 | MPLS (LABEL2) | EXP(2) | EN-12 |
| | ⋮ | ⋮ | ⋮ | ⋮ | |
| | MODE 1 | PORT NUMBER 1 | MPLS (LABELi) | EXP(i) | EN-1i |
| 330-2 | MODE 2 | PORT NUMBER 2 | SIP (ADDRESS1) | SPORT(1) | EN-21 |
| | MODE 2 | PORT NUMBER 2 | SIP (ADDRESS2) | SPORT(2) | EN-22 |
| | ⋮ | ⋮ | ⋮ | ⋮ | |
| | MODE 2 | PORT NUMBER 2 | SIP (ADDRESSm) | SPORT(m) | EN-2j |
| 330-3 | MODE 3 | PORT NUMBER 3 | DIP (ADDRESS1) | DPORT(1) | EN-31 |
| | MODE 3 | PORT NUMBER 3 | DIP (ADDRESS2) | DPORT(2) | EN-32 |
| | ⋮ | ⋮ | ⋮ | ⋮ | |
| 330-n | ⋮ | ⋮ | ⋮ | ⋮ | |
| | MODE N | PORT NUMBER n | xxxxx | xxxxx | EN-nm |

SEARCH KEY GENERATOR 31

MODE CONDITION TABLE 311A

| INPUT PORT NUMBER | PROTOCOL IDENTIFIER | MODE CONDITION | |
|---|---|---|---|
| PORT NUMBER 1 | MPLS | * | 311A-1 |
| PORT NUMBER 2 | IP$_V$6 | INPUT LOGICAL PORT NUMBER | 311A-2 |
| ⋮ | ⋮ | ⋮ | |
| PORT NUMBER n | IP$_V$6 | FLOW LABEL | 311A-n |

FIG.16

FLOW MODE TABLE 311B

| INPUT PORT NUMBER | MODE CONDITION | | FLOW MODE | |
|---|---|---|---|---|
| | INPUT LOGICAL PORT NUMBER | FLOW LABEL | | |
| PORT NUMBER 1 | * | * | MODE1 | ~311B-1 |
| PORT NUMBER 2 | LOGICAL PORT1 | * | MODE3 | ~311B-2 |
| PORT NUMBER 2 | LOGICAL PORT2 | * | MODE2 | ~311B-3 |
| PORT NUMBER 2 | * | * | MODE2 | ~311B-4 |
| ⋮ | ⋮ | ⋮ | ⋮ | |
| PORT NUMBER n | * | FLOW LABEL1 | MODE3 | |
| PORT NUMBER n | * | * | MODE2 | ~311B-p |

3111, 3115, 3113, 3115-1, 3115-2

DEVICE FOR FLOW CLASSIFYING AND PACKET FORWARDING DEVICE WITH FLOW CLASSIFY FUNCTION

BACKGROUND OF THE INVENTION (1) Field of the Invention

The present invention relates to a packet forwarding device and a device for flow classifying for connecting a plurality of networks, further in details to a device for flow classifying and a packet forwarding device utilizing Content Addressable Memory (CAM).

(2) Description of the Related Art

According to a packet forwarding device, for example, a router for constituting Internet Protocol (IP) network, there is needed a flow classify function for classifying a flow to which a packet belongs from header information of a received packet. Here, a flow signifies a series of packets specified by a combination of an identifier (port number) of an input port or an output port of a packet, an IP address included in a header of a received packet, a protocol identifier, a Type of Service (TOS), and a priority and the like. The packet forwarding device carries out a flow control of determination of necessity or unnecessity of packet drop (filtering determination), determination of a packet forwarding priority (QoS: Quality of Service) for ensuring communication quality and the like for respective flow classified by a flow classifying portion.

In recent years, in order to deal with a rapid increase in IP traffic, there is investigated high speed formation of flow classifying. For example, there is disclosed "A flow identification method using content addressable memory" (Related Art 1) utilizing Content Addressable Memory (CAM) in Proceedings of Plenary Cession of the Society of Electronics, Information and Communication Engineers, 2000, SB-4-2.

In the case of flow classifying using CAM, as shown in FIG. 2, a search key KEY is generated by a flow controller 61 and is given to CAM 62. As shown in FIG. 3, CAM 62 is stored with a plurality of flow entries 620-1 through 620-n each describing an item value constituting a flow condition and an address of the flow entry having the flow condition in coincidence with the search key KEY is outputted. The flow controller 61 is provided with a context table 63 instructing a forwarding control to be executed to an input packet corresponding to the flow entry address of CAM 62, forwarding control instruction corresponding to an output address of the CAM, is read from the context table 63 and the input packet is processed in accordance with the instruction. According to CAM, a classifying time period of entry does not depend on a number of registered flow entries and therefore, the flow classifying can be constituted by high speed formation by utilizing CAM.

According to the related art 1, when all the items (field) necessary for flow classifying, for example, a source IP address 601, a destination IP address 602 and a protocol 603 are extracted as search key information from header information of the input packet and there are present a plurality of flow entries in coincidence with the search key in CAM 62, it is proposed to give a priority to the entry having the youngest address. Further, according to the related art 1, it is proposed to register the entry for flow classifying having a long bit width and the entry for forwarding control having a short bit width in one CAM and search simultaneously the flow identifying entry in coincidence with the flow classifying condition indicated by a search key and the entry for forwarding control in coincidence with a higher specific item of the flow identifying condition.

According to the IP network, in order to correspond to novel technologies of expansion of IP address by Ipv6 (RFC2460, Internet Protocol Version 6(Ipv6) Specification, R. Hinden et al), MPLS label stack (RFC3032, "MPLS Label Stack Encoding" E. Rosen et al) by MPLS Fast Reroute (draft-haskin-mpls-fast-reroute-05. text,"Method for Setting an Alternative Label Switched Paths to Handle Fast Reroute" D. Haskin et al), there is a tendency of expanding a bit length of a search key (for flow condition) at a flow classifying portion of a packet forwarding device and constituting a variety of flow conditions.

As a countermeasure against a case in which the bit length of the flow condition is increased and exceeds a search bit width capable of being provided by CAM, for example, in Proceeding of Plenary Cession of the Society of Electronics, Information and Communication Engineers, 2000, B-6-21, there is proposed "A flow identification method for Ipv6 using context addressable memory" for finding an entry in coincidence with the flow classifying condition by dividing the search key in two and executing twice search of flow entry search by the first half key and front entry search of the latter key.

According to the related art 2, as shown in FIG. 4, CAM is divided into a flow entry region 62A for the first half and a flow entry region 62B for the latter half and a class field 621 and a rule number field 622 of the first and the latter halves are given to the respective flow entries. Further, in search result holding tables 63 (63A, 63B), there are designated necessity for the later search 631, a rule number 632 and action 633. According to the first half key KEY-A and the flow entry of the first half, the rule number field 622 becomes Don't Care value, as a result of CAM search by the first half key KEY-A, the rule number is specified from the search result holding table 63A and by CAM search by the latter half key KEY-B applied with the rule number, an action to be executed to the input packet is determined.

Further, according to JP-A-2001-156840 (Related Art 3), there is proposed a flow classifying device in which there are extracted specific fields capable of constituting a flow condition, for example, a source address, a destination address, a protocol, and Type of Service (TOS) included in an IP header, and a source port and a destination port included in TCP or UDP header, a flag bit for masking previously registered in a search flag table corresponding to an input logical link number, is applied to these field items, thereby, for the respective input logical link, effective data is left only to an item (field) necessary for flow classification, there is generated a search key in the form in which an item which is not needed for flow classification is substituted for an ineffective value and access is made to CAM for a flow search table by the search key.

However, the above-described Related Art 2 proposes one resolution measure when the bit length of the search key is increased and does not intend to shorten the bit lengths of the search key and the flow entry. Further, according to the related art 3, by adopting general purpose search key format including all the items of header information which can constitute the flow identifying condition and masking an item of header information which is not needed of the respective input logical link, checking of the search key and flow entry is facilitated, similar to the related art 2, it is not intended to shorten the bit lengths of the search key and the flow entry.

When a variety of the flow classifying conditions are dealt with by the search key of the same format for general purpose in this way, the bit length of the search key is increased to face the problem of pin neck and deficiency in capacity of CAM in CAM 62 and LSI 61 for flow control.

SUMMARY OF THE INVENTION

It is an object of the invention to provide a device for flow classifying and a packet forwarding device capable of dealing with a variety of flow conditions by effectively utilizing CAM.

It is other object of the invention to provide a device for flow classifying and a packet forwarding device capable of effectively utilizing a capacity of CAM even when the variety of flow conditions are constituted by shortening a bit length of search key of CAM.

In order to achieve the above-described object, according to an aspect of the invention, there is provided a device for classifying comprising a flow classifying Content Addressable Memory (CAM) having a plurality of flow entries, a search key generator for generating a search key of a format which differs in accordance with a flow condition; and a table for holding a flow search result corresponding to an address of the respective flow definition entry of the CAM, wherein access is made to the CAM by the search key of a variable format including at least one item of header information extracted from a packet header in accordance with the flow condition and the flow search result is obtained from the table in accordance with the address of the flow definition entry in coincidence with the search key outputted from the CAM.

The flow classify CAM comprises a plurality of table regions corresponding to kinds of the format of the search key, includes a plurality of the flow entries each describing a value of the item of header information constituting the flow condition for the respective table region and outputs the address of an initial one of the flow entries in coincidence of the search key.

Further, according to another aspect of the invention, there is provided a packet forwarding device which is a packet forwarding device connected to pluralities of input and output ports for forwarding a packet received from the respective input port to any of the output ports specified by header information, the packet forwarding device comprising a flow classifier for classifying a packet flow to which the packet belongs from the header information of the respective received packet, and means for executing a forward control previously designated for the respective received packet for the respective packet flow, wherein the flow classifier comprising a flow classifying CAM having a plurality of flow entries, and a search key generator for generating a search key having a format which differs by a flow condition and access is made to the CAM by the search key of a variable format including at least one item of the header information extracted from the packet header.

Describing in further details, the search key generator is provided with a search key definition table designating the item of header information constituting a flow condition corresponding to an identifier of the respective input port, refers to the search key definition table based on the identifier of the input port of the respective received packet and generates the search key including the item of header information designated by the table.

According to en embodiment of the invention, the search key generator is provided with a flow mode table indicating a corresponding relationship between the identifier of the respective input port and a flow mode and a search key table designating the item of header information constituting a flow condition corresponding to a respective flow mode indicated by the flow mode table, and the search key generator specifies the flow mode of the respective received packet in reference to the flow mode table and generates the search key in accordance with a flow condition of the specified flow mode indicated by the search key table.

According to other embodiment of the invention, the search key generator includes a mode condition table showing a corresponding relationship between an identifier of the respective input port and a mode condition, a detection mode table indicating a corresponding relationship among the identifier of the respective input port, the mode condition and a flow mode and a search key definition table designating the item of header information constituting a flow condition corresponding to the respective flow mode indicated by the flow mode table, the search key generator specifies the flow mode of the received packet from the flow mode table in accordance with the identifier of the input port of the received packet and the mode condition designated by the mode condition table and generates the search key in accordance with the flow condition of the specified flow mode indicated by the search key definition table.

Here, the header information referred by the flow classifier includes internal header information generated by an input port interface connected to the respective input port. The inner header information is constituted by a plurality of fields indicating, for example, an input port identifier, an output port identifier and forwarding priority information and when a plurality of logical paths are multiplexed on a single physical port, as the above-described input/output port identifiers, there are applied a physical port identifier and a local port identifier. Further, when the mode condition table is set with flow conditions for respective paths multiplexed on the same input port, as the mode conditions, for example, there is stored information for path identifying of an input logical port number, a flow label and the like.

According to the invention, the CAM search key is constituted by a format including only items necessary for flow classifying of the respective received packet having no redundant field and therefore, the bit lengths of the search key and the CAM flow entry can be shortened and even when a variety of the flow conditions are constituted, flow search at high speed can be carried out by effectively utilizing the capacity of CAM.

BRIEF DESCRIPTION OF THE DRAWINGS

FIG. 2 is a diagram showing an outline constitution of a flow classifying system utilizing CAM;

FIG. 3 is a diagram for explaining flow classifying according to a related art 1 utilizing CAM;

FIG. 9 is a diagram showing an example of content of a flow mode table 311 shown in FIG. 8;

FIG. 10 is a diagram showing an example of content of a search key table 312 shown in FIG. 8;

FIG. 12 is a diagram showing an example of content of a flow classifying CAM 33 shown in FIG. 8;

FIG. 16 is a diagram showing an example of content of a flow mode table 311B shown in FIG. 14;

DETAILED DESCRIPTION OF THE PREFERRED EMBODIMENTS

An explanation will be given of embodiments of the invention in reference to the drawings as follows.

Figure 5:
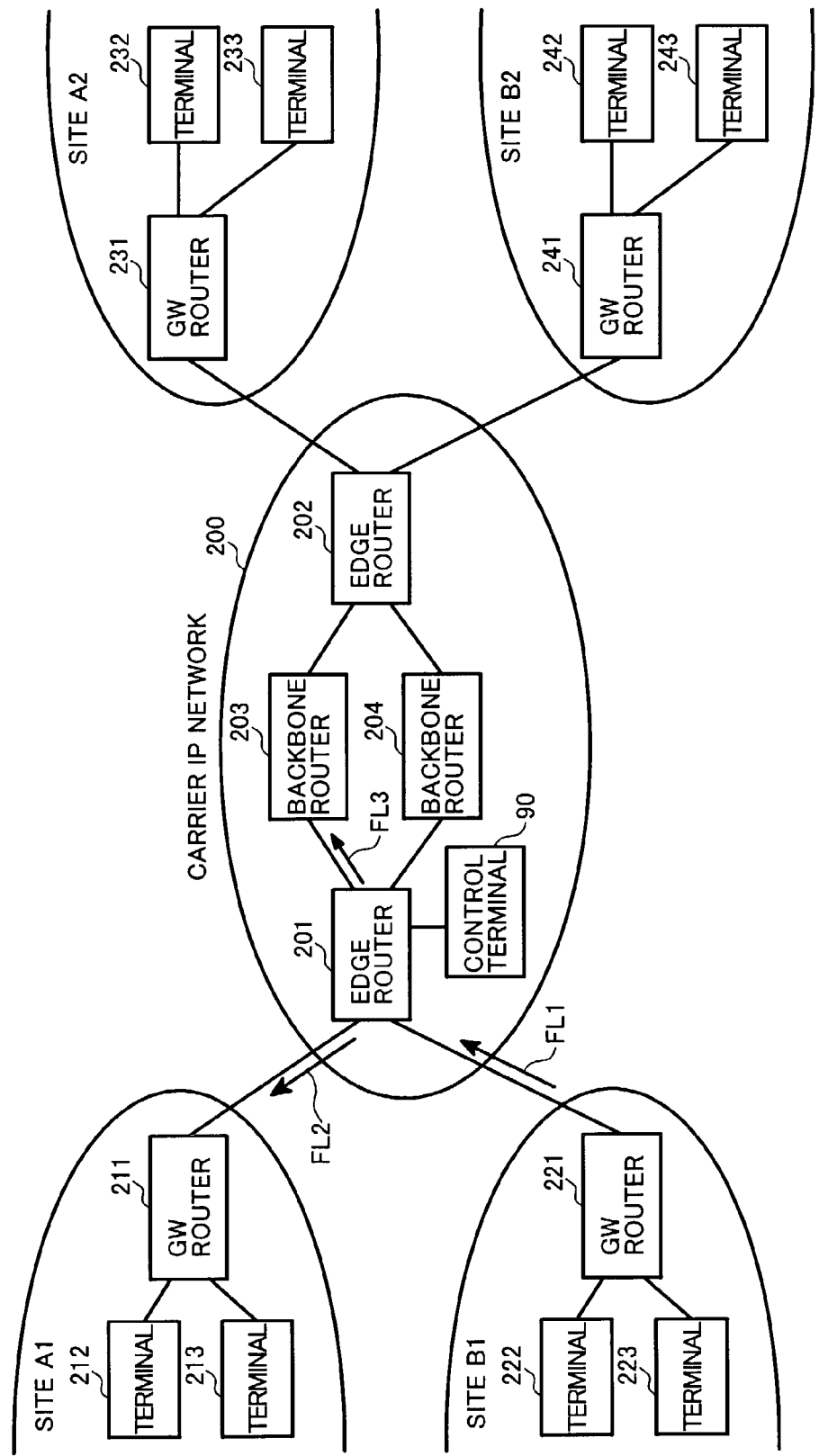
FIG. 5 is a diagram showing an example of a communication network to which a packet forwarding device according to the invention is applied.

FIG. 5 shows an example of a communication network to which a packet forwarding device according to the invention is applied.

According to the communication network, sites A1 and A2 belonging to enterprise A and the sites B1 and B2 belonging to enterprise B are communicated respectively via a carrier IP network 200.

The carrier IP network 200 is comprised of edge routers 201 and 202 and backbone routers 203 and 204 arranged between the edge routers. Packet forwarding at inside of the carrier IP network 200 is carried out by Multi Protocol Label Switching (MPLS) for identifying a path by an MPLS label added to an IP packet. According to MPLS, traffic engineering or VPN (Virtual Private Network) can be realized and priority of packet forwarding can be displayed by an EXPerimental (EXP) bit field.

The site A1 is constituted by a plurality of terminals 212, 213, . . . connected to the edge router 201 via a gate way (GW) router 211 and the site A2 is constituted by a plurality of terminals 232, 233, . . . connected to the edge router 202 via a GW router 231. Similarly, the site B1 is constituted by a plurality of terminals 222, 223, . . . connected to the edge router 201 via a GW router 221 and the site B2 is constituted by a plurality of terminal 242, 243, . . . connected to the edge router 202 via a GW router 241.

The packet forwarding device according to the invention is applied to the edge routers 201 and 202. In the following explanation, assume that the IP packet having an Ipv6 address is communicated between the sites A1 and B1 and the edge router 201. According to the invention, for example, the edge router identifies a flow to which the respective input packet belongs such as a packet flow FL1 directed from the GW router 221 to the edge router 201, a packet flow FL2 directed from the edge router 201 to the GW router 211, and a packet flow FL3 directed from the edge router 201 to the backbone router 203 and executes forwarding control previously designated for the respective flow.

Figure 6:
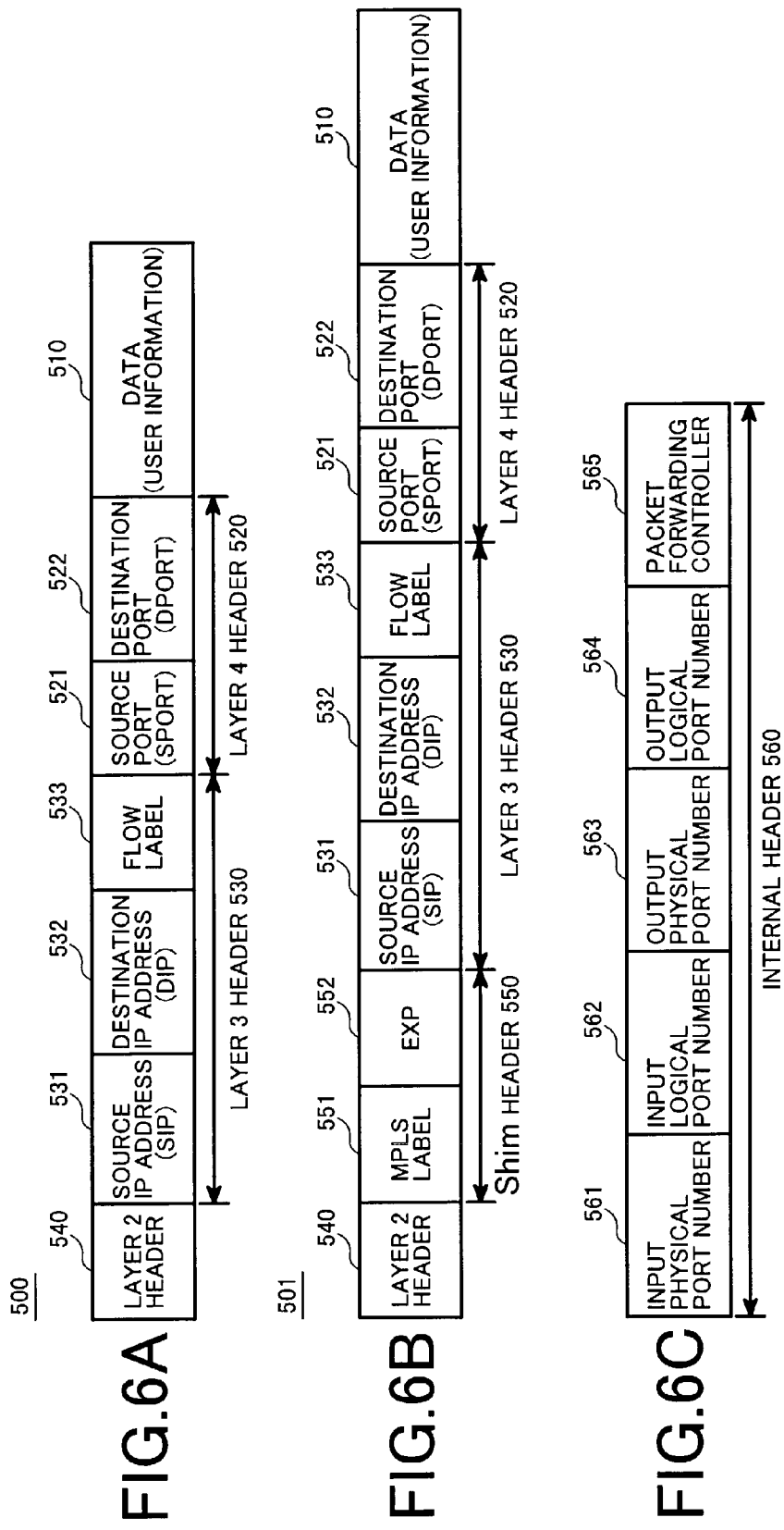
FIG. 6A is a diagram showing an example of a format of a packet inputted to an edge router 201 shown in FIG. 5.
FIG. 6B is a diagram showing an example of a format of a packet inputted to an edge router 201 shown in FIG. 5.
FIG. 6C is a diagram showing an example of a format of an internal header generated by the edge router.

FIGS. 6A, 6B and 6C designate packet formats dealt with by the edge router 201.

FIG. 6A shows a format of packet 500 transmitted and received between the edge router 201 and the sites A1 and B1. The packet 500 is constructed by a constitution in which a data (user information) portion 510 is added with a packet header comprising a header 520 of layer 4 (transport layer), a header 530 of layer 3 (network layer), and a header 540 of layer 2 (data link layer) in an ISO reference model.

The layer 4 header 520 includes a source port (Source Port: "SPORT"), and destination port (Destination Port: "DPORT") 522 representing a higher order application, and information of a sequence number or the like omitted in the drawing. The layer 3 header 530 includes a source IP address (Source IP Address: "SIP") 531, a destination IP address (Destination IP Address: "DIP") 532, a flow label 533, and other information.

The layer 2 header 540 is set with information of, for example, a source MAC address and a destination MAC address in the case of Ethernet (registered trade mark) or Data Link Connection Identifier (DLCI) in the case of Frame Relay in accordance with a kind of connection ports with the GW routers 211 and 221 and the edge router 201. When the connection port is ATM port, the IP packet comprising the data portion 510 through the layer-3 header 530, is divided into a plurality of blocks having fixed lengths, a cell header including VPI/VCI is added to the respective block and data forwarding of an ATM cell style is carried out. In this case, the layer-2 header 540 signifies VPI/VIC to be added to the ATM cell. Although here, there is shown the packet format in which the protocol of the network layer is IP, according to flow control of the invention, there may be provided a packet format in which the protocol of the network layer is other than IP, for example, IPX or the like.

FIG. 6B shows a format of a packet 501 transmitted and received between the edge router 201 and the backbone routers 203 and 204.

The packet 501 is constructed by a constitution of adding an Shim header 550 for MPLS between the layer-2 header 540 and the layer-3 header 530 of the packet 500. The Shim header 550 includes an MPLS label 551 and information of TTL (lifetime) or the like.

FIG. 6C shows a constitution of an internal header 560 added to heads of the packets 500 and 501 for packet forwarding and flow controlling at inside of the edge router 201.

The internal header 560 is constituted by fields indicating an identifier (physical port number 561 and logical port number 562) of an input port receiving the packet, an identifier (physical port number 563 and logical port number 564) of an output port by which the packet is to be transmitted, and a priority 565 of packet forwarding. Contents of fields indicating the logical port numbers 562 and 564 are made effective when, for example, a plurality of paths are multiplexed on input and output ports.

Figure 1:
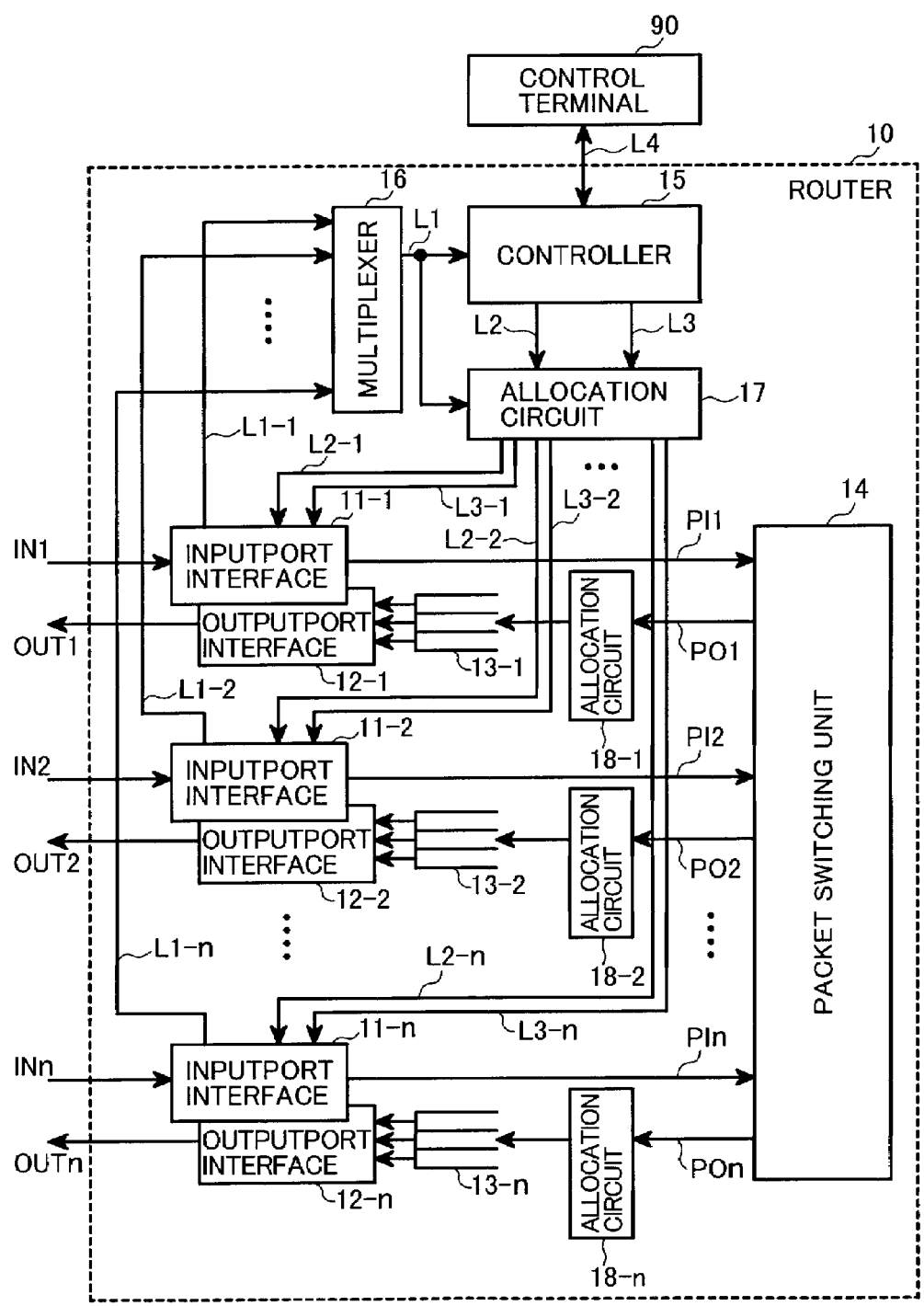
FIG. 1 is a block diagram showing an embodiment of a packet forwarding device according to the invention.
Figure 4:
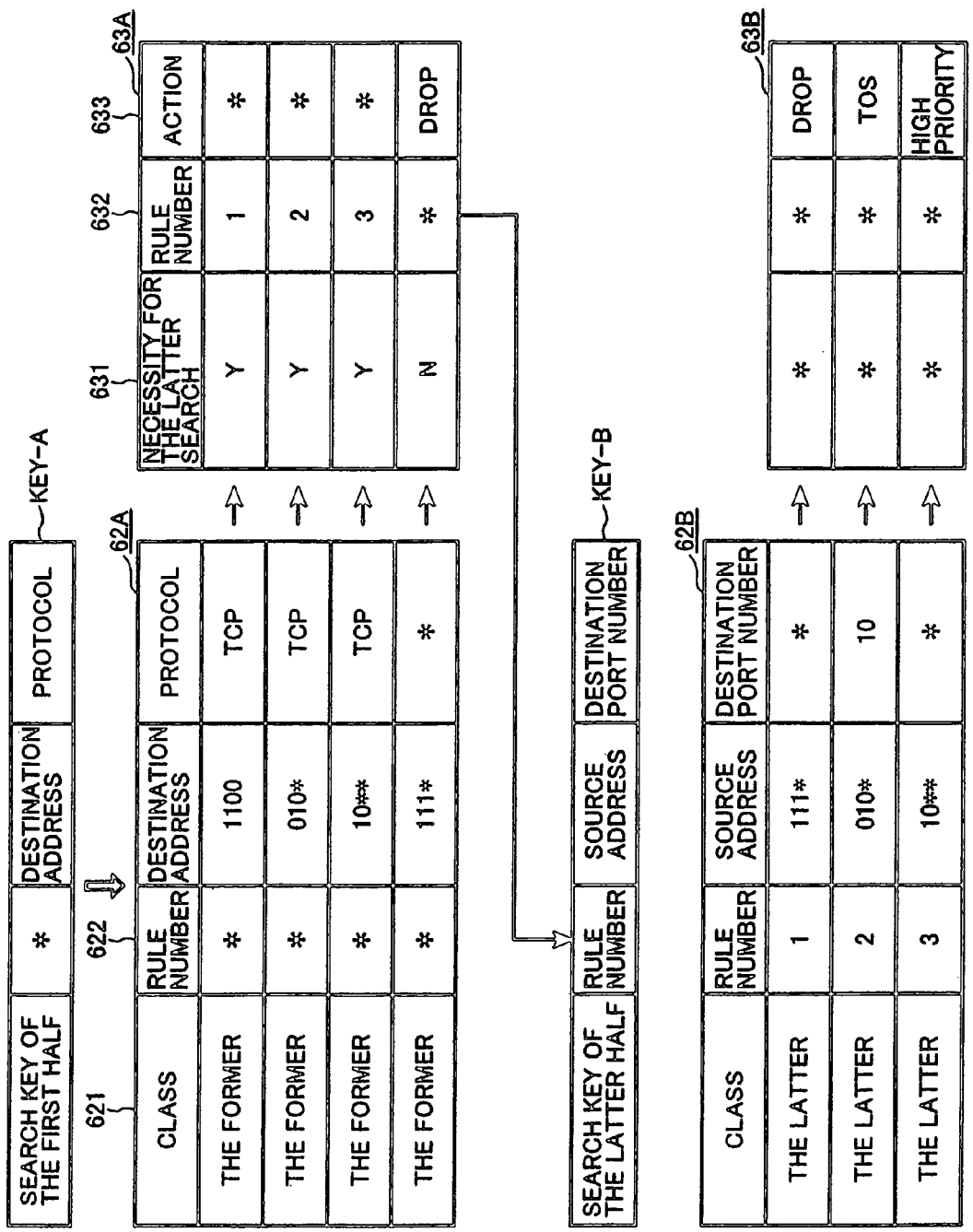
FIG. 4 is a diagram for explaining flow classifying according to a related art 2 utilizing CAM.

FIG. 1 shows an embodiment of packet forwarding device 10 according to the invention applicable as the above-described edge router 201.

The packet forwarding device 10 is constituted by a plurality of input port interfaces 11-$i$ ($i$=1 through n) respectively connected to input ports INi ($i$=1 through n), a plurality of output port interfaces 12-$i$ ($i$=1 through n) respectively connected to output ports OUTi ($i$=1 through n), output buffers 13-$i$ and packet allocation circuits 18-$i$ ($i$-1 through n) respectively provided to the output port interfaces 12*i*, a packet switching unit (packet switching portion) 14 connected to the plurality of input port interfaces 11-*i* and the packet allocation circuits 18*i*, a controller 15 having a function of determining (routing) of the output ports constituting forwarding destinations of variable length packets received by respective input port interfaces 11-*i* and a flow detecting function, a multiplexer 16 for successively supplying packet header information outputted from the respective input port interface 11-*i* to signal lines L1-*i* (i=1 through n), to the controller 15, and an allocation circuit 17 for supplying output port identifiers (output port numbers) outputted to signal lines L2 and L3 by the controller 15 and the flow control instruction information to the input port interfaces 11-*i* constituting forwarding sources of respective packet header information.

As described later, the controller 15 is provided with various kinds of tables and CAM and data is set to the tables from a control terminal 90 via a signal line L4.

Figure 7:
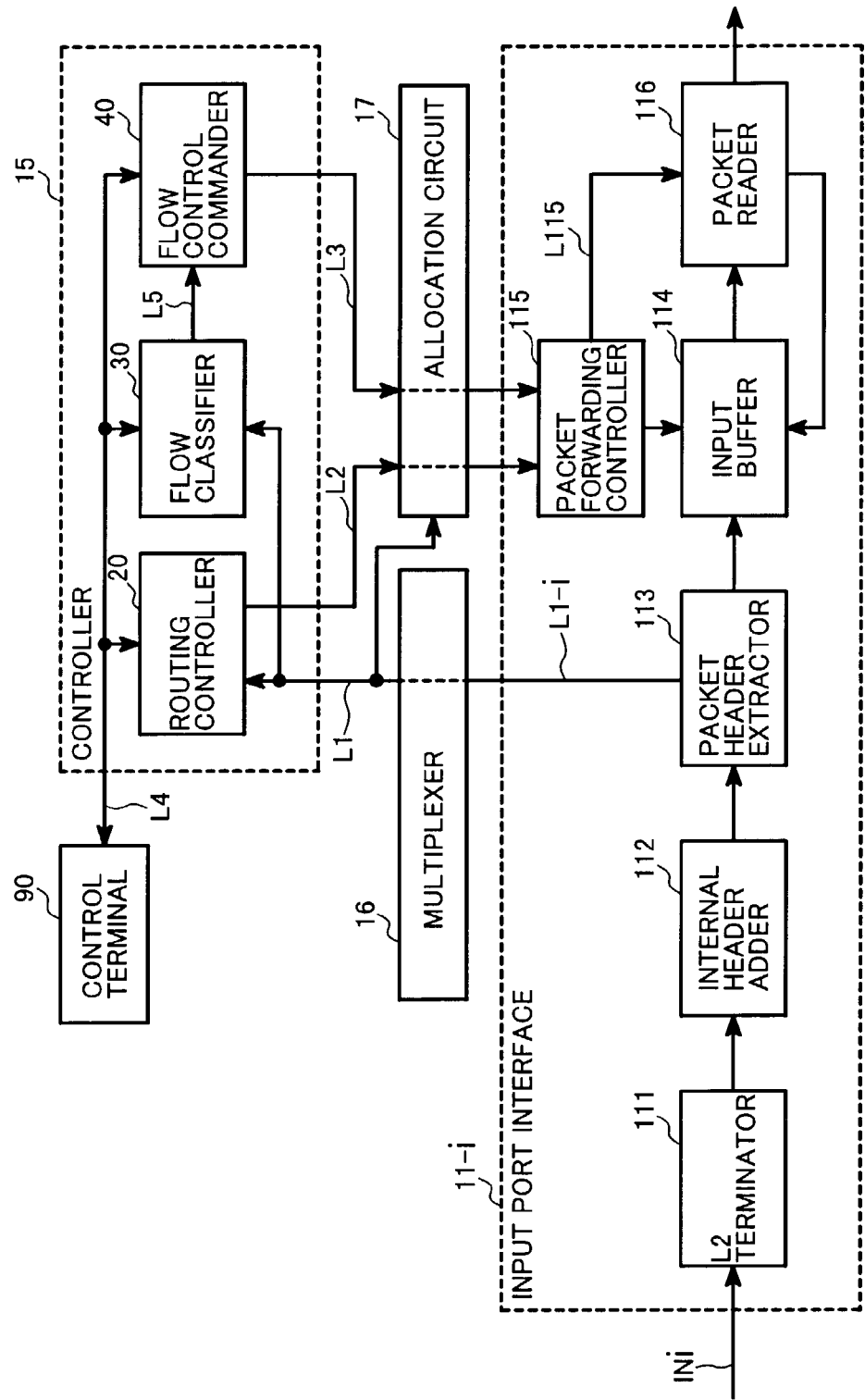
FIG. 7 is a block diagram showing details of an input port interface 11-*i* and a controller 15 shown in FIG. 1.

FIG. 7 shows details of the input port interface 11-*i* and the controller 15.

The input port interface 11-*i* is constituted by an L2 terminator 111 for reproducing the input packet 500 or 501 from a signal received from the input port INi, an internal header adder 112 for adding the internal header 530 to the input packet received from the L2 terminator 111 and outputting the input packet as an internal packet, a packet header extractor 113 for storing the internal packet received from the internal header adder 112 to an input buffer 114 and outputting the packet header (layer 4 header 520 through internal header 560) extracted from the internal packet to the signal line L1-*i*, a packet forwarding controller 115 for controlling to rewrite header information of packet stored in the input buffer 114 and forward the header information to the packet switching unit 14, and a packet reader 116 for reading the packet subjected to header conversion from the input buffer 114.

The L2 terminator 111 reproduces the input packet 500 or 501 from the received cell when the packet received from the input port INi is an ATM cell and sets a value of VPI/CVI extracted from the received cell header to the layer 2 header 540. The internal header adder 112 generates the internal header 560 having the format shown by FIG. 6C and sets a previously designated identifier (number) of the input port INi to the physical port number 561. When multiplexed paths are formed on the input port, a path identifier is set to the input logical port number 562, otherwise, a meaningless value is set to the input logical port number 562. At the time point, meaningless values are set to the output physical port number 563, the output logical port number 564 and the packet forwarding priority.

The controller 15 is composed of a routing controller 20, a flow classifier 30 and a flow control commander 40.

The routine controller 20 is provided with a routing table, extracts the destination IP address 522 from packet header information outputted from the multiplexer 16 to the signal line L1, reads an output port identifier (output physical port number and output logical port number) which is previously registered corresponding to the destination IP address from the routing table and outputs the output port identifier to the signal line L2.

The flow classifier 30 generates a search key comprising a plurality of items of the header information extracted from the packet header information in accordance with a flow condition and searches a flow entry corresponding to the search key from a flow CAM. The flow control commander 40 refers to a search result holding table in accordance with a value of a flow entry address outputted from the flow CAM to a signal line L5 and outputs flow control instruction information (kind of packet processing or forwarding priority) instructed by the table to the signal line L3.

The output port identifier outputted to the signal line L2 and the flow control instruction information outputted to the signal line L3 are inputted to the allocation circuit 17. The allocation circuit 17 is given a value i of the input port number 561 in the packet header information outputted to the signal line L1 as a control signal and the output port number and the flow control instruction information inputted from the signal lines L2 and L3 are allocated to the packet forwarding controller 115 of the input port interface 11-*i* specified by the input port number i.

When the flow control instruction information indicates provision of priority, the packet forwarding controller 115 writes the output port identifier (values of output physical port number 563 and output logical port number 564) and the priority (value of packet forwarding priority 565) received from the allocation circuit 17 to the internal header 560 of the head packet stored in the input buffer 114 and instructs to read the packet to the packet reader 116. Thereby, QoS control to the input packet is realized.

When the flow control instruction information indicates packet drop, instruction to write information to the internal header 560 and read the packet to the packet reader 116 is omitted and the received packet is dropped. Thereby, filtering control of the input packet is realized.

The packet forwarding controller 115 successively processes stored packets in the input buffer by disposing an address read from the input buffer to a head address of a succeeding packet at each time of forwarding or dropping the packet from the input buffer 114.

Although according to the embodiment shown in FIG. 7, there is constructed a constitution in which the routing controller 20 is commonly used by the plurality of input port interfaces, there may be constructed a constitution in which the routing controller 20 is arranged to the respective input port interface 11-*i* and the controller 15 is provided with the flow classifier 30 and the flow control commander 40.

In FIG. 1, the packet switching unit 14 is provided with input ports PIi (i=1 through n) connected to the input port interfaces 11-*i* (i=1 through n) and output ports POi (i=1 through n) connected to the packet allocation circuits 18-*i* (i=1 through n) for switching a packet received from the respective input port PIi to the output port PIj specified by a value j of the output physical port number 563. Transmission buffers 13-*j* are constituted by the plurality of transmission queues corresponding to priorities and the allocation circuits 18-*j* store packets outputted from the output ports PIj to any of the transmission queues in accordance with the packet forwarding priority 565 of the internal header. The output port interfaces 12-*j* read packets stored in the transmission buffers 13-*j* in an order of priorities, remove the internal headers 530 and thereafter, transmit the packets to the output port OUTj in the form of adding L2 headers in accordance with the protocol of the data link layer of the output ports OUTj.

Figure 8:
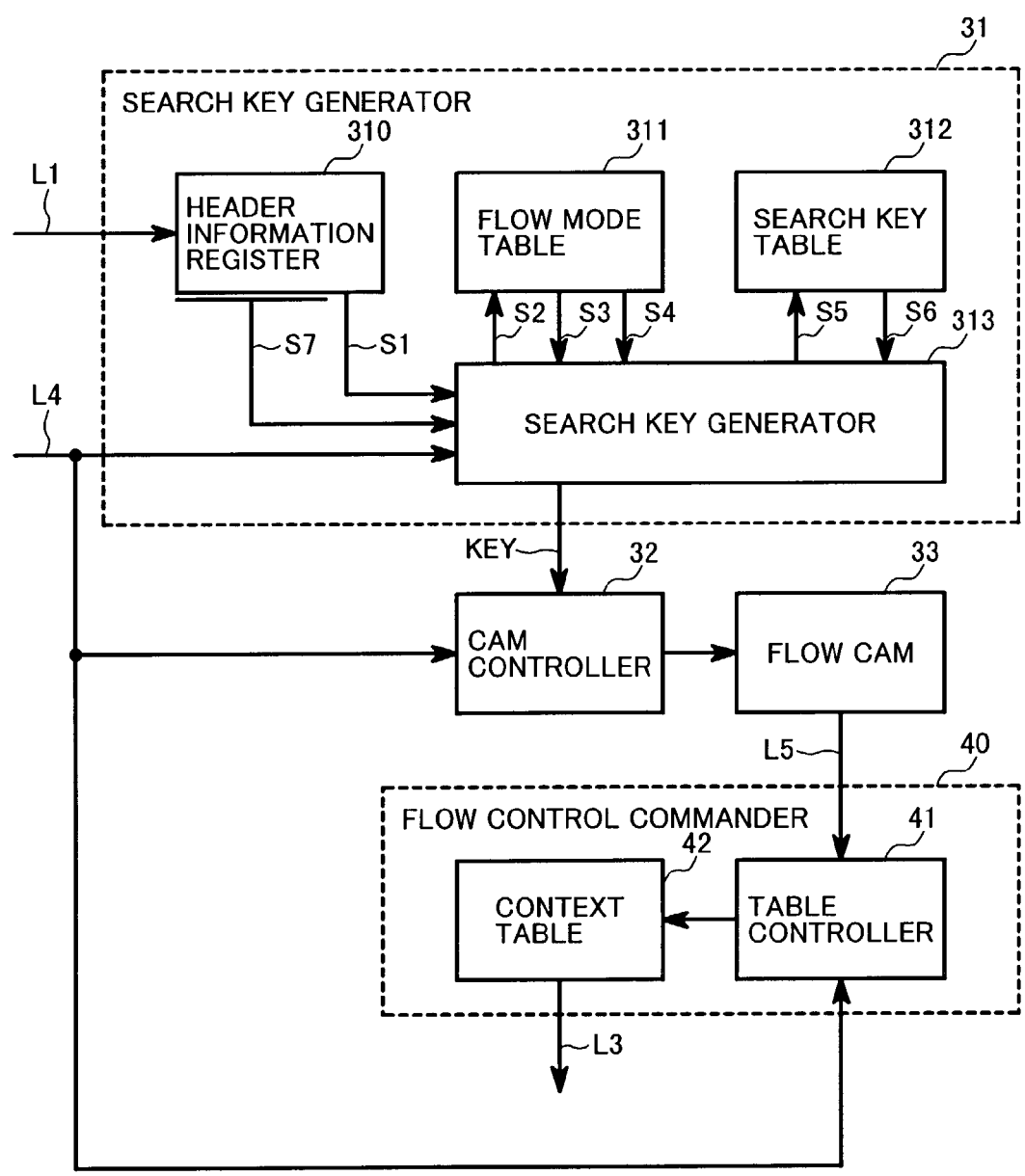
FIG. 8 is a diagram showing details of a first embodiment of a search key generator 31 and a flow control commander 40 shown in FIG. 7.

FIG. 8 shows an embodiment of the flow classifier 30 and the flow control commander 40.

The flow classifier 30 is composed of a search key generator 31, a CAM controller 32 and a flow CAM 33. The search key generator 31 is composed of a header information register 310 for storing header information received from the signal line L1, a flow mode table 311, a search key table 312, and a search key generator 313.

As shown in, for example, FIG. 9, the flow mode table is constituted by a plurality of entries 311-1, 311-2, . . . indicating an identifier 3112 showing the protocol on the input port and a flow mode 3113 corresponding to the input port number (input physical port number) 3111. The flow mode 3113 indicates a kind (type) of a format of a search key to be generated by the search key generator 313.

Further, as shown in, for example, FIG. 10, the search key table 312 is constituted by a plurality of entries 312-1, 312-2, . . . designating an element of search key 3122 constituting a flow condition corresponding to a flow mode 3121. The element of search key 3122 indicates names of items (names of fields) of header information constituting constituent elements of the search key to be generated by the search key generator 313.

Here, the entry 312-1 signifies that flow of a flow mode 1 identified by a combination of the MPLS field 551 and the EXP field 552 of the input packet (refer to FIG. 6B) and the entry 312-2 signifies that flow of a flow mode 2 is determined by a combination of the SIP531 and the SPORT521 of the input packet. Further, the entry 312-3 signifies that a flow of a flow mode 3 is determined by a combination of the DIP532 and the DPORT522 of the input packet.

Referring back to FIG. 8, the header information register 310 is set with the header information 560 through 520 of the input packet extracted by the packet header extractor 113. According to the embodiment, the search key generator 131 reads a value of the input physical port number field 561 (hereinafter, simply referred to as input port number) disposed at the head of the internal header 560 as shown by a signal line S1 and reads the protocol identifier 3112 (signal line S3) and the flow mode 3113 (signal line S4) corresponding to the input port number 561 (signal line S2) from the flow mode table 311.

The search key generator 313 refers to the search key table 312 in accordance with the flow classifying mode 3113 (signal line S5) and reads the search key element 3112 (signal line S6) corresponding to the flow mode. Further, the search key generator 313 reads the value of the header information item (signal line S7) instructed by the search key element 3112 from the header information register 310 and generates the flow search key KEY including the header information items.

Further, although the header information stored in the header information register 310 is constituted by a format which partially differs by the input port as shown in FIGS. 6A and 6B, the format of the header information stored in the register 310 is specified by the protocol identifier 3112 read from the flow mode table 311 and therefore, in accordance with the protocol identifier, the search key generator 313 can extract an arbitrary item of the header information instructed by the search key element 3112 from the header information register 310. Further, setting and updating an entry to the flow mode table 311 and the search key table 312, are carried out via the signal line L4 from the control terminal 90 and the search key generator 313.

Figure 11:
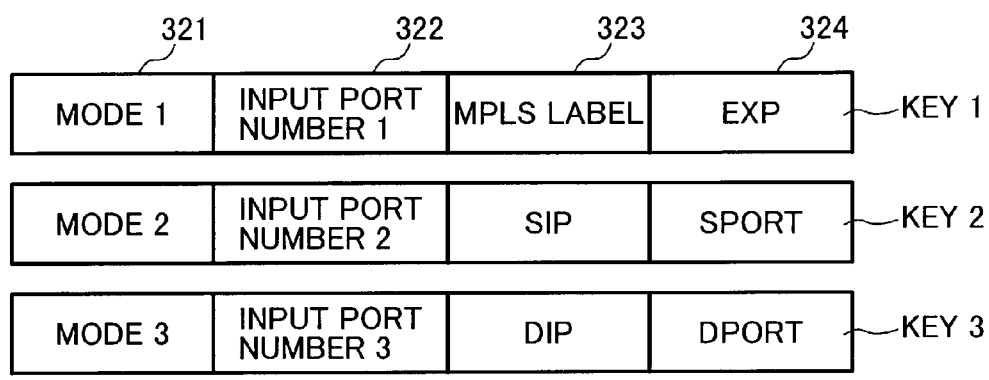
FIG. 11 is a diagram showing an example of flow search key KEY outputted from the search key generator 31 shown in FIG. 8.

FIG. 11 shows an example of the flow search key generated by the search key generator 313.

The flow search key is constituted by the flow mode 321, the input port number 322 and the search key elements 323, 324, . . . instructed the search key table 312. The flow search keys KEY1 through KEY3 shown here respectively correspond to the flow mode 1 through flow mode 3 shown in FIG. 10.

According to the embodiment, when the packet received from the input port of the port number 1 is processed, there is generated the flow search key KEY1 of the format comprising the mode 1, the input port number 1, MPLS and EXP and when the packet received from the input port of the port number 2 is processed, there is generated the flow search key KEY2 of the format comprising the mode 2, the input port number 2, SIP and SPORT. Further, when the packet received from the input port of the port number 3 is processed, there is generated the flow search key KEY3 of the format comprising the mode 3, the input port number 3, DIP and DPORT.

The flow search key KEY generated by the search key generator 313 is given to the CAM controller 32. The CAM controller 32 makes access to the flow CM 33 in accordance with the flow search key KEY.

According to the invention, as shown in, for example, FIG. 12, the flow CAM33 is divided into a plurality of table regions 330-1 through 330n corresponding to the flow mode (flow key format) and the respective table region 330-j is registered with a plurality of flow entries EN-jk (j=1 through n, k=1, 2, . . . ) described with the header information items corresponding to the flow search key.

Therefore, when access is made with the above-described flow search key KEY1, any of the entries EN-11 through EN-1i registered to the table region 330-1 and an address of the flow entry which is found firstly is inputted to the signal line L5. Similarly, when access is made by the flow search key KEY2, an entry in coincidence with a search condition is searched from the entry group (EN-21 through EN-2j) registered to the table region 330-2, when access is made by the flow search key KEY3, an entry in coincidence with the search condition is searched from the entry group (EN-31, EN-32, . . . ) registered in the table region 330-3 and entry addresses which are found firstly in the respective regions are outputted to the signal line L5. Further, setting and updating the flow entry to the flow CAM 33 is carried out from the control terminal 90 via the signal line L4 and the CAM controller 32.

The entry address outputted from the flow CAM 33 to the signal line L5 is inputted to the flow control commander 40. The flow control commander 40 is composed of a table controller 41 and a context table 42 as shown in FIG. 8.

Figure 13:
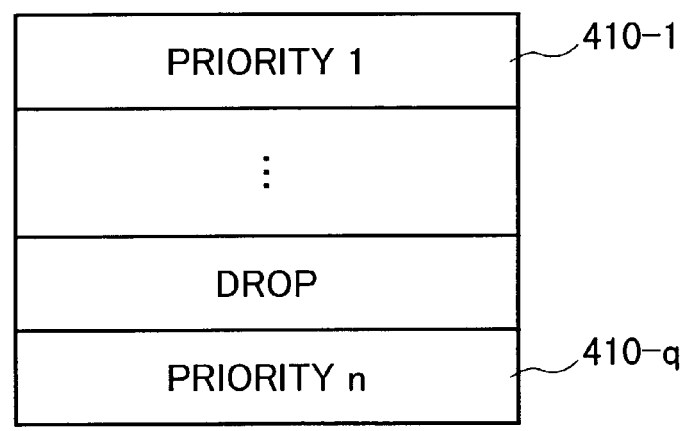
FIG. 13 is a diagram showing an example of content of a context table 42 shown in FIG. 8.

The context table 42 is for holding a result of searching CAM and includes a plurality of entries 410-1 through 410-q corresponding to the flow entry addresses of the flow CAM 33 as shown in FIG. 13. The entries 410-1 through 410-q are set with QoS control (priority) information and filtering control information to be given to the input packet as the flow control instruction information.

When the table controller 41 receives the flow entry address from the signal line L5, the table controller 41 reads the flow control instruction information corresponding to the flow entry address from the context table 42 to the signal line L3. Setting and updating of an entry to the context table 42 is carried out from the control terminal 90 via the signal line L4 and the table controller 41.

As described above, according to the flow classifier 30 of the invention, the flow search key KEY is generated in accordance with the flow condition previously instructed by the search key table 312 for the respective input port and there is searched flow entry in coincidence with the flow search key KEY from the flow CAM 33. Therefore, according to the invention, as shown in FIG. 11, the respective flow search key KEY is constituted by the structure combined with only an inherent item of header information of the respective input port and therefore, the bit length of the flow search key can be shortened. Further, as a result of shortening the bit length of the flow search key, the bit length of the flow entry registered to the flow CAM 33 is also shortened and the memory capacity of the flow CAM 33 can effectively be utilized.

In contrast thereto, in the case of adopting, for example, a system of making access to CAM always by the search key of the same format as in the related art 1, when there are needed a plurality of kinds of flow identifying conditions having different combinations of header information as in the above-described mode 1 to mode 3, the flow search key and the CAM entry includes redundant fields which become useless in individual flow classifying.

For example, when three kinds of flow classifying of the mode 1 through the mode 3 shown in FIG. 10, is intended to realize by the related art, in the search key format comprising seven fields of the input port number, MPLS, EXP, SIP, SPORT, DIP and DPORT, it is necessary that fields of SIP, SPORT, DIP and DPORT of the search key and flow entry are constituted by Don't care values in flow classifying of the mode 1, fields of MPLS, EXP, DIP and DPORT are constituted by Don't care values in flow classifying of the mode 2 and fields of MPLS, EXP, SIP and SPORT are constituted by Don't care values in flow classifying of the mode 3.

In this case, it is apparent that the bit length of the search key is increased and a rate of utilizing the CAM capacity is considerably reduced in comparison with the invention. Further, when from a restriction of the entry width capable of being searched by CAM, for example, as in the related art 2, the search key is obliged to be divided into the first half key and the latter half key and CAM is obliged to be divided into the flow entry region for the first half and the flow entry region for the latter half, other than the reduction in the rate of utilizing the CAM capacity, described above, there poses a problem of an increase in a necessary time period of flow processing. The present invention solves these problems.

Although according to the flow classifier 30 shown in FIG. 8, the search key generator 313 generates the flow search key KEY inherent to the respective input port by using the flow mode table 311 and the search key table 312, when the input port number and the flow identifying condition are brought into a one-two-one relationship, there may be constructed a constitution in which the flow mode table 311 and the search key table 312 are merged and the search key generator 313 directly obtains the protocol identifier 3112 (S3) and the search key element 3122 (S6) from a merged table based on the input port number (S2) without interposing the flow mode 3113. In this case, the flow mode 331 can be excluded from the respective flow entries of the respective search key and the flow CAM 33.

Figures 14, 15:
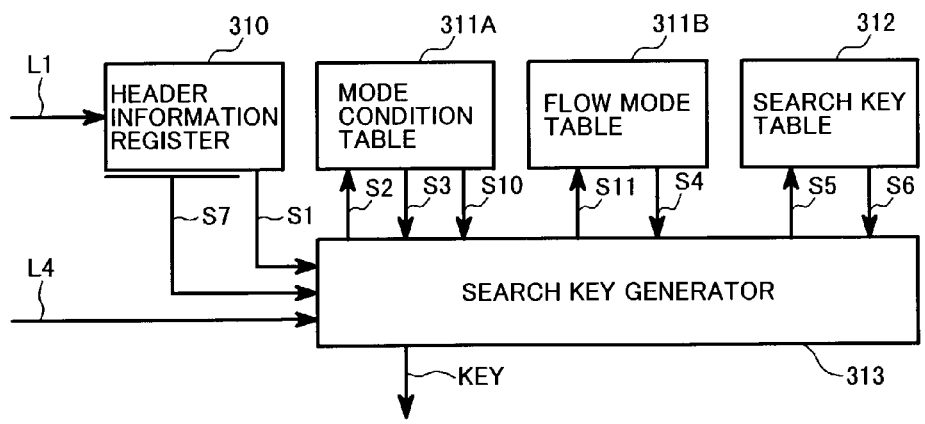
FIG. 14 is a diagram showing a second embodiment of the search key generator 31.
FIG. 15 is a diagram showing an example of content of a mode condition table 311A shown in FIG. 14.

FIG. 14 shows a second embodiment of the search key generator 31.

According to the embodiment, a plurality of kinds of flow modes can be set on the same input port and the embodiment is characterized in that the flow mode table 311 is constituted by a mode condition table 311A and a flow mode table 311B.

As shown in, for example, FIG. 15, the mode condition table 311A is constituted by a plurality of entries 311A-1 through 311A-n indicating a protocol identifier 3112 and a mode condition 3114 corresponding to an input port number 3111. Here, the mode condition 3114 indicates an item of header information necessary for specifying a flow mode on an input port having the input port number 3111.

Meanwhile, as shown in, for example, FIG. 16, the flow mode table 311B according to the invention is constituted by a plurality of entries 311B through 311B-p indicating a relationship between a header information item 3115 constituting a mode condition and a flow mode 3113 corresponding to the input port number 3111. The mode condition 3115 indicates a plurality of items corresponding to header information items used as the mode conditions 3114 in the mode condition table 311A, in this example, values of an input logical port number 3115-1 and a flow label 3115-2. Mark * signifies a mask item or Don't care value excluded from the mode condition.

The search key generator 313 reads an input port number 571 (signal line S1) from the header information register 310 and reads the protocol identifier 3112 (signal line S3) and the mode condition 3114 (signal line S10) corresponding to the input port number (signal line S2) from the mode condition table 311A.

Here, for example, assuming that the value of the input port number 571 read from the header information register 310 is "port number 2", "input logical port number" indicated by the entry 311A-2 is read as the mode condition 3114 from the mode condition table 311A. In this case, the search key generator 313 extracts a value of the input logical port number 562 of the internal header 356 from the header information register 310 and reads the flow mode 3113 (signal line S4) from the flow mode table 311B with values of "port number 2" and the input logical port number 562 as a key (signal line S11). When the value of the input logical port number 562 is "logical port 1", the flow mode becomes "mode 3" and when the value is "logical port 2", the flow mode becomes "mode 2".

Similar to the first embodiment explained in reference to FIG. 8, the search key generator 313 refers to the search key table 312 in accordance with the mode 3113 (signal line S5), reads the search key element 3112 (signal line S6) corresponding to the mode 3113, and reads header information (signal line S7) of an item instructed by the search key element 3112 to thereby generate the flow search key KEY including the header information.

According to the embodiment, as apparent from contents of the flow mode table 311B shown in FIG. 16, it is possible to instruct selectively the flow mode to the a plurality of flows multiplexed on the same input port and apply a plurality of kinds of different flow conditions on the same input port.

Figure 17:
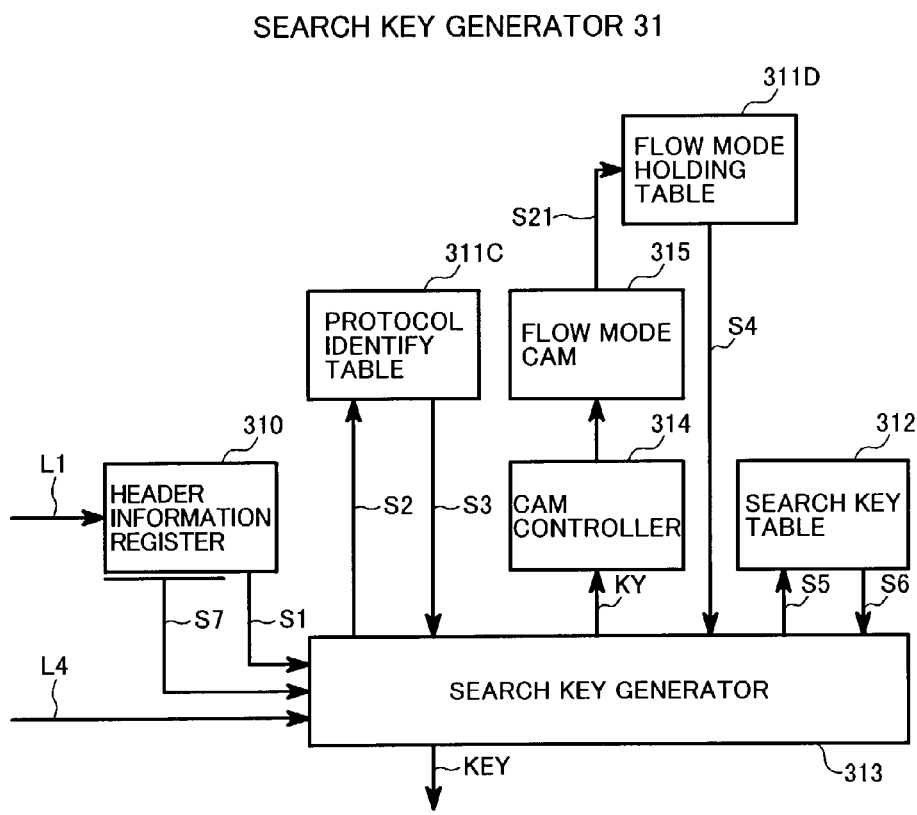
FIG. 17 is a diagram showing a third embodiment of the search key generator 31.

FIG. 17 shows a third embodiment of the search key generator 31.

The embodiment is characterized in that by applying CAM to search of the flow mode table 311B according to the second embodiment, a time period necessary for generating the search key KEY is shortened. The search key generator 31 of the embodiment is provided with a protocol identifier table 311C, a CAM controller 314, a flow mode CAM 315 and a flow mode holding table 311D in place of the mode condition table 311A and the flow mode table 311B shown in FIG. 14.

The protocol identifier table 311C shows a relationship between the input port number 3111 and the protocol identifier 3112 in the mode condition table 311A shown in FIG. 15. Further, the flow mode CAM 315 is constituted by a plurality of entries showing a relationship between the input port number 3111 and the mode conditions 3115 (3115-1, 3115-2) in the flow mode table 311B shown in, for example, FIG. 16 and the flow mode holding table 311D is stored with the flow mode 3113 in the flow mode table 311B corresponding to the entry address of the flow mode CAM 315.

The search key generator 313 reads the input port number 571 (signal line S1) from the head information register 310 and reads the protocol identifier 3112 (signal line S3) corresponding to the input port number (signal line S2) from the protocol identifier table 311C.

Figure 18:
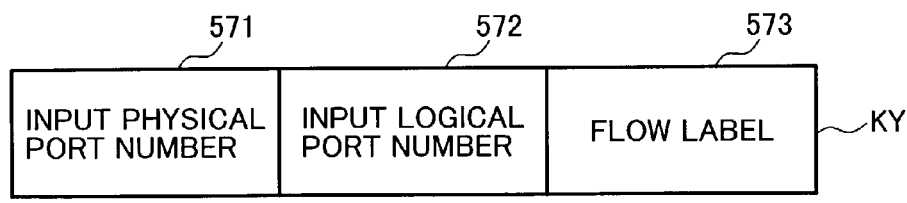
FIG. 18 is a diagram showing an example of CAM search key KY given to a CAM controller 314 from a search key generator 313 shown in FIG. 17.

According to the embodiment, regardless of the input port number, the search key generator 313 reads values of the input logical port number 562 and the flow label 532 (signal line S7) instructed as the mode condition 3115 by the flow mode CAM 315 from the header information register 310, generates the search key KY comprising an input physical port number 571, the input logical port number 562 and the flow label 532 as shown in FIG. 18 and gives the search key KY to the CAM controller 314.

The CAM controller 314 makes access to the flow mode CAM 315 by the search key KY. As a result, there is outputted an address of an entry which is found firstly and having a content in coincidence with the search key KY from the flow mode CAM 315 to a signal line S12 and a value of the flow mode corresponding to the CAM output address is read from the flow mode holding table 311D to the signal line S4.

Similar to embodiments explained in reference to FIG. 8 and FIG. 14, the search key generator 314 refers to the search key table 312 in accordance with the flow mode (signal line S5), reads the search key element 3112 (signal line S6) corresponding to the flow mode 3113 and reads a value of the header information item instructed by the search key element 3112 (signal line S7) from the header information register 310 to thereby generate the flow search key KEY including the header information item.

According to the invention, even when the flow condition is set by the same flow mode (same combination of header information items) to a plurality of flows on the input port as shown by, for example, the entry 311B-1 or 311B-p of FIG. 16, or even when the flow condition is set by a flow mode which differs in accordance with a value of the specific header information items such as the input logical port number or the flow label (combination of different header information items) as shown by the entry 311B-2 or 311B-3 in FIG. 16, by utilizing several kinds of header information items which can constitute the input port number and the mode condition, it is possible to swiftly specify the flow mode and generate the search key KEY necessary for making access to the flow CAM 33 in a short time.

As is apparent from the above-described embodiments, according to the invention, by generating the search key of the format which differs in accordance with the flow condition, even when a variety of the flow conditions are constituted, the bit length of the search key can be shortened. Therefore, the use of the present invention can also shorten the bit length of the flow entry which is brought into the corresponding relationship with the search key and can realize effective utilization of the CAM capacity for flow classifying and high-speed flow classifying under a variety of flow conditions.

What is claimed is:

1. A packet forwarding device connected to a plurality of input and output ports for forwarding a packet received from one of the input ports to one of the output ports specified by header information of the packet, the packet forwarding device comprising:
   a flow classifier for classifying the packet into one of packet flows to which the packet belongs, according to the header information of the packet; and
   means for executing on the packet a forward control previously designated for said one packet flow;
   wherein the flow classifier includes:
   a flow Content Addressable Memory (CAM) having a plurality of flow entries;
   a search key generator for generating a search key having a variable format which differs depending on a combination of information items to constitute a flow condition; and
   a table for specifying the forward control to be executed on the packet in response to an address of a flow entry outputted from said flow CAM,
   wherein said flow CAM includes a plurality of table regions corresponding to the format of the search key, each of said table regions includes a plurality of flow entries each including a plurality of information fields for indicating values of information items to constitute the flow condition and excluding information fields containing information which is not necessary for a respective input logical link,
   wherein all of the flow entries in said flow CAM are compared with the search key to output an address of one of the flow entries matched with the search key, and the search key includes at least one header information item extracted from the header of the packet.

2. The packet forwarding device according to claim 1, wherein said search key generator is provided with a search key definition table designating header information items to constitute a flow condition in association with an identifier of said one input port, refers to the search key definition table based on the identifier of the input port which receives said packet, and generates the search key including the header information items designated by the table.

3. The packet forwarding device according to claim 1, wherein said search key generator is provided with a flow mode table indicating a correspondence between the identifier of said one input port and a flow mode, and a search key definition table designating header information items to constitute a flow condition in association with a flow mode indicated by the flow mode table; and
wherein the search key generator specifies the flow mode of the packet by referring to the flow mode table and generates the search key based on a flow condition read out from the search key definition table in accordance with the specified flow mode.

4. The packet forwarding device according to claim 1, wherein the search key generator includes: a mode condition table indicating a correspondence between an identifier of said one input port and a mode condition; a detection mode table indicating a correspondence among the identifier of said input port, a mode condition and a flow mode; and a search key definition table designating header information items to constitute a flow condition in association with a flow mode indicated by the flow mode table, and
wherein the search key generator specifies the flow mode of the packet from the flow mode table in accordance with the identifier of the input port which receives said packet and the mode condition designated by the mode condition table, and generates the search key based on a flow condition read out from the search key definition table in accordance with the specified flow mode.

5. The packet forwarding device according to claim 1, wherein the header information of the packet includes internal header information generated by an input port interface associated with the input port, and the internal header information including an input port identifier and an output port identifier.

6. The packet forwarding device according to claim 1, wherein at least one of information fields of each flow entry in one of said table regions indicating a header information item which is different in kind from a header information item of a corresponding information field of flow entries in another one of the table regions.

7. A packet forwarding device connected to a plurality of input and output ports for forwarding a packet received from each of the input ports to one of the output ports specified by header information of the packet, said packet forwarding device comprising:

a controller for classifying the packet into one of packet flows to which the packet belongs, according to the header information of the packet and determining forward control to be executed on the packet; and means for executing the forward control determined by the controller on the packet;

wherein the controller includes a flow classifier comprising:

a flow Content Addressable Memory (CAM) having a plurality of flow entries;

a search key generator for generating a search key having a variable format which differs depending on a combination of information items to constitute a flow condition; and a table for specifying the forward control to be executed on the packet in response to an address of a flow entry outputted from said flow CAM, wherein said flow CAM includes a plurality of table regions corresponding to the format of the search key, each of said table regions includes a plurality of flow entries each including a plurality of information fields for indicating values of information items to constitute the flow condition and excluding information fields containing information which is not necessary for a respective input logical link, wherein all of the flow entries in said flow CAM are compared with the search key to output an address of one of the flow entries matched with the search key, and the search key includes at least one header information item extracted from the header of the packet.

8. The packet forwarding device according to claim 7, wherein said controller includes a table controller for reading out information specifying the forward control to be executed on the packet therefrom in response to the address of the flow entry outputted from said flow CAM.

9. The packet forwarding device according to claim 7, wherein at least one of information fields of each flow entry in one of said table regions indicating a header information item which is different in kind from a header information item of a corresponding information field of flow entries in another one of the table regions.

10. A device for flow controlling comprising:

a flow Content Addressable Memory (CAM) having a plurality of flow entries;

a search key generator for generating a search key having a variable format which differs depending on a combination of information items to be a flow condition; and a table for specifying a flow search result corresponding to an address of a flow definition entry of the flow CAM, said flow search result designating flow control to be executed on a packet, wherein said flow CAM includes a plurality of table regions corresponding to the format of the search key, each of said table regions includes a plurality of flow entries each including a plurality of information fields for indicating values of information items to constitute the flow condition and excluding information fields containing information which is not necessary for a respective input logical link, wherein all of the flow entries in said flow CAM are compared with the search key to output an address of one of the flow entries matched with the search key, and the search key includes at least one header information item extracted from the header of the packet, and wherein the flow search result is read out from the table in accordance with the address of the flow entry outputted from the CAM.

11. The device according to claim 10, wherein at least one of information fields of each flow entry in one of said table regions indicating a header information item which is different in kind from a header information item of a corresponding information field of flow entries in another one of the table regions.

* * * * *